United States Patent [19]
Ito et al.

[11] Patent Number: 5,083,479
[45] Date of Patent: Jan. 28, 1992

[54] ELECTRONIC CONTROL TYPE AUTOMATIC SPEED CHANGER

[75] Inventors: Yasunobu Ito; Kenji Suzuki, both of Okazaki, Japan

[73] Assignee: Aisin AW Co., Ltd., Japan

[21] Appl. No.: 633,620

[22] Filed: Dec. 28, 1990

[30] Foreign Application Priority Data

Dec. 29, 1989 [JP] Japan .................. 1-342176

[51] Int. Cl.⁵ .............................. B60K 41/08
[52] U.S. Cl. ........................ 74/860; 180/197
[58] Field of Search ............ 74/860; 180/197

[56] References Cited

U.S. PATENT DOCUMENTS

| | | | |
|---|---|---|---|
| 4,104,991 | 8/1978 | Abdoo | 74/860 X |
| 4,226,141 | 10/1980 | Espenschied | 74/860 X |
| 4,583,611 | 4/1986 | Frank et al. | 180/197 |
| 4,721,176 | 1/1988 | Kabasin et al. | 180/197 |
| 4,800,781 | 1/1989 | Yasue et al. | 74/860 |
| 4,850,656 | 7/1989 | Ise et al. | 180/197 X |
| 4,921,064 | 5/1990 | Wazaki et al. | 180/197 |
| 4,933,851 | 6/1990 | Ito et al. | 192/0.032 X |
| 4,933,857 | 6/1990 | Hashiguchi et al. | 180/197 X |
| 4,939,656 | 7/1990 | Hoashi et al. | 180/197 X |
| 5,000,280 | 3/1991 | Wazaki et al. | 180/197 |

Primary Examiner—Leslie A. Braun
Assistant Examiner—William O. Trousdell
Attorney, Agent, or Firm—Lorusso & Loud

[57] ABSTRACT

To prevent wheel spinning in reverse gear on a slippery road surface the electronic control system of the present invention transmits signals representing the states of a reverse range detecting switch and a winter mode switch to a microcomputer, and output signals from the microcomputer are transmitted to an engine control computer which in turn, sends ignition period delay angle signals to the spark timing controller, and the output torque of the engine is thereby reduced. When the output torque of the engine is reduced, the driving power to the wheels is decreased and slippage is reduced in reverse start on a low coefficient of friction $\mu$ path.

15 Claims, 5 Drawing Sheets

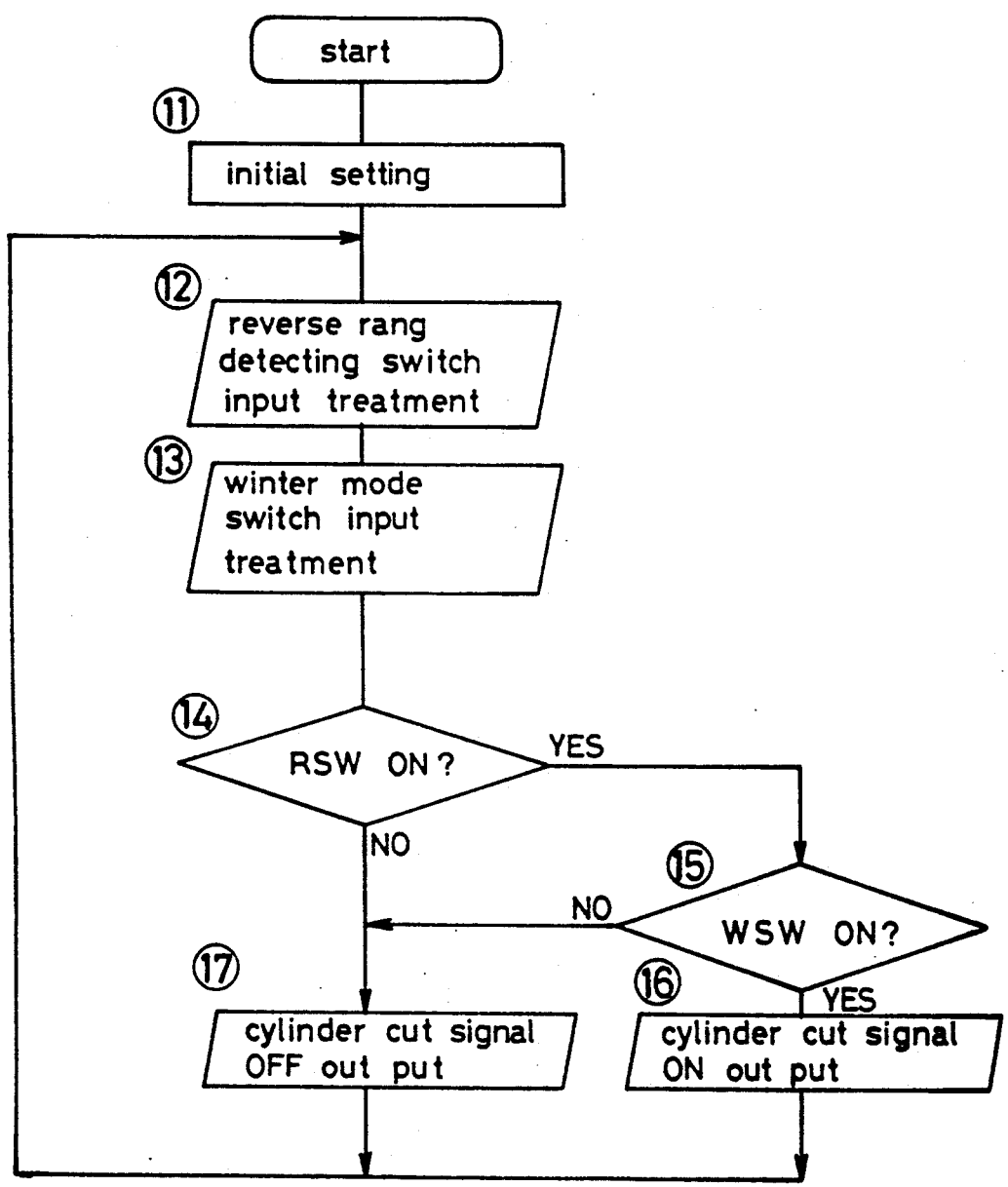

ELECTRONIC CONTROL TYPE AUTOMATIC SPEED CHANGER

BACKGROUND OF THE INVENTION

1. Field of the Invention

The present invention relates to an electronic control type automatic speed (gear ratio) changer, which is particularly effective in initiating reverse movement (backing) on a low coefficient of friction road surface liable to cause slippage, such as a snowy or frozen surface.

2. Prior Art

Heretofore, in a vehicle having an automatic speed changer, with the car speed at zero, that is, when the vehicle is stopped, the forward speed range has been set in such a manner as to always advance from first speed (first gear). Therefore, although there is no special problem in the case of normal running, on a low coefficient of friction road surface such as a snowy or frozen road, a vehicle so equipped was susceptible to wheel spinning which made initiation of advancement difficult.

With the advent of electronic control type automatic speed changers it became possible to freely regulate speed changing by electrically controlling a shift solenoid with a mode selection switch to provide a winter mode, a hold mode, etc., in order to prevent slippage on a road covered by snow or ice and to allow initiation of advancement in second or third speed.

However, with the above-described conventional technology, although initiation of advancement on a low μ surface as snow or ice could be suitably controlled, there was only one gear range, and the prevention of slippage was not possible.

Accordingly, the object of the present invention is to provide electronically controlled automatic transmission having the capability of providing a smooth reverse start under the above-described problematic conditions.

SUMMARY OF THE INVENTION

In order to attain the above-described object, the present invention provides an electronically controlled automatic speed changer, which is provided with a reverse range detecting switch for detecting (manual) movement of a shift lever to a reverse position, a winter mode switch for selecting a winter mode, an electronic control device for reading and inputting the operational states of these switches, and an engine control computer receiving the input from the electronic control device. When both the above-described reverse range detecting switch and the winter mode switch are in the on state, the output speed of the engine is reduced.

According to the present invention, whereby, when the vehicle advances in reverse from a stop on snow or ice, the output of the engine may be reduced by placing both the above-described reverse range detecting switch and the winter mode switch in the on state, whereby the torque transmitted to the wheels can be decreased, and slippage and spinning can thereby be prevented.

BRIEF DESCRIPTION OF THE DRAWINGS

FIG. 5 is a block diagram illustrating control in accordance with another embodiment of the invention.

DESCRIPTION OF THE PREFERRED EMBODIMENTS

Figure 1A:
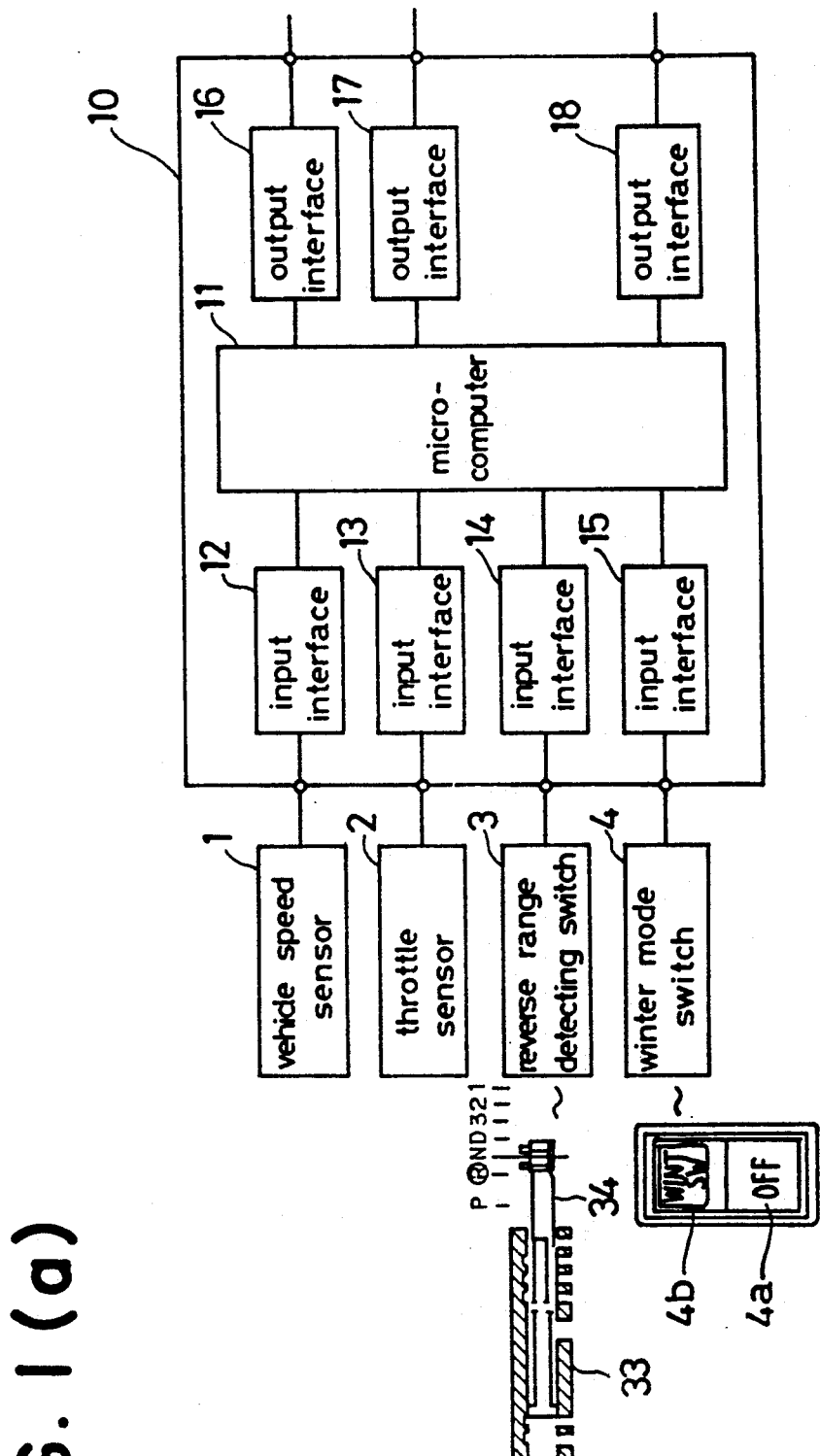
FIG. 1(a) and FIG. 1(b) is a schematic diagram of an electronic circuit for control of an automatic speed changer in an embodiment of the present invention.
Figure 1B:
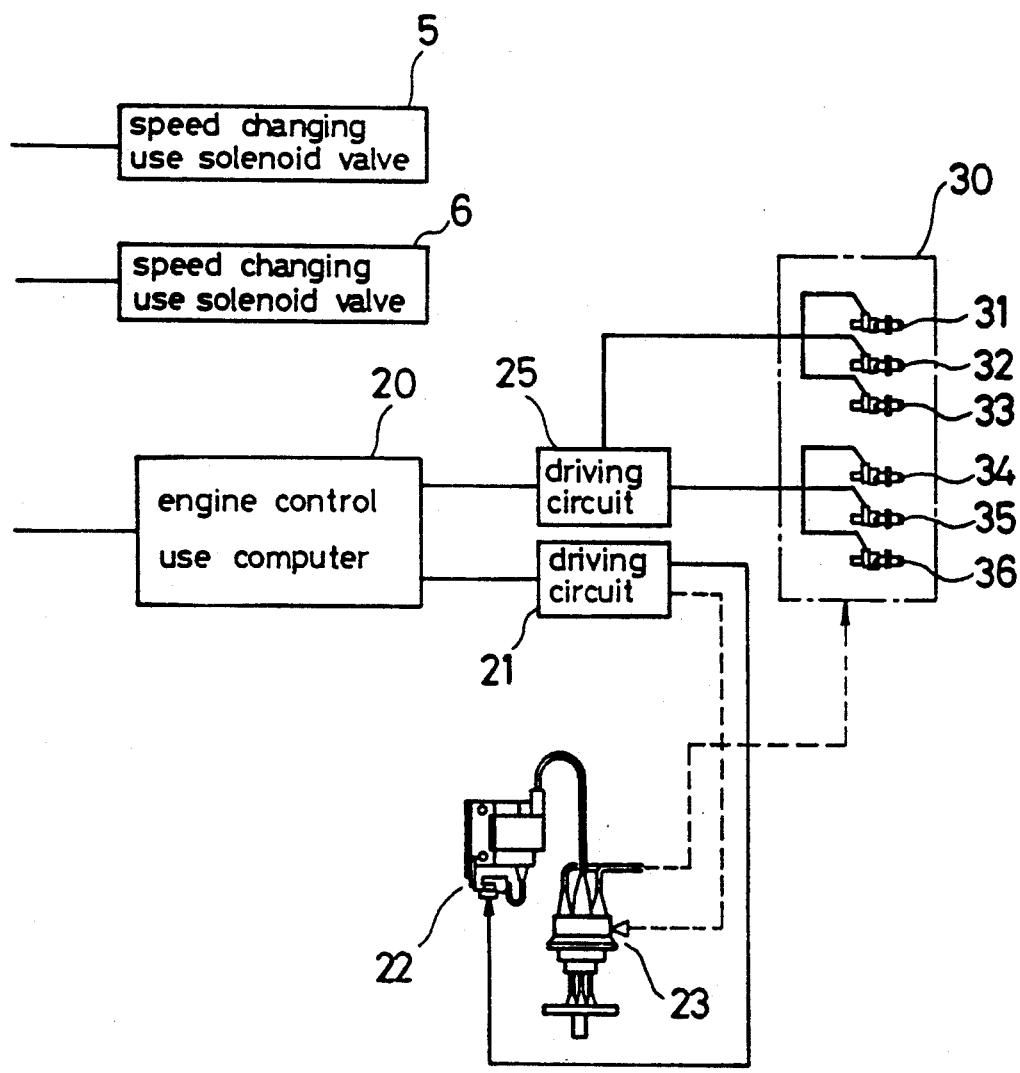
Figure 2:
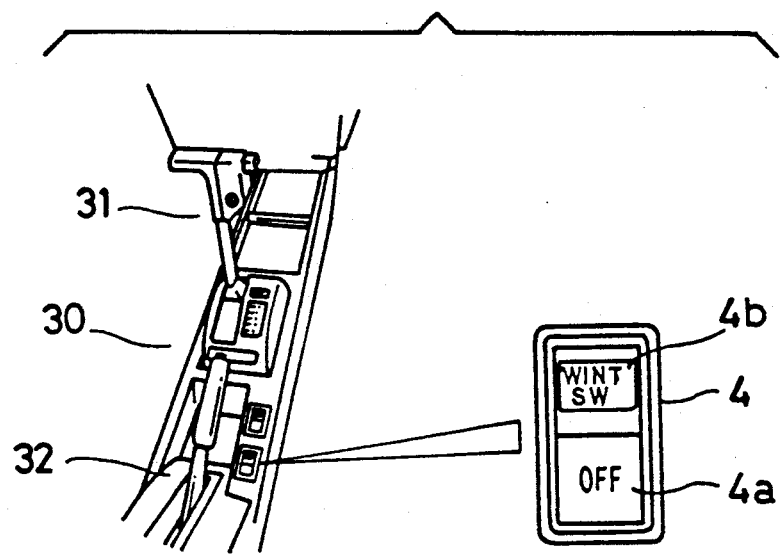
FIG. 2 illustrates the mounting of the winter mode switch in accordance with the present invention.
Figure 3:
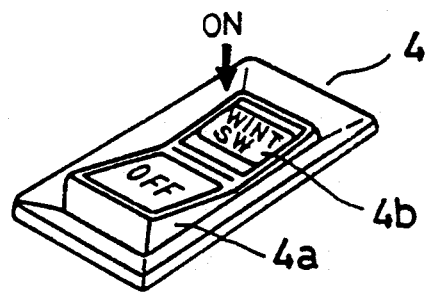
FIG. 3 is a perspective view of the winter mode switch shown in FIG. 2.

In FIGS. 1(a) and 1(b), 1 denotes a wheel speed sensor for detecting the wheel speed, 2 a throttle sensor for detecting the degree of throttle opening, 3 a reverse range detecting switch (R detecting switch) for detecting the reverse state, 4 a winter mode switch for selecting the winter mode, 5 the first speed change solenoid valve, 6 the second speed change solenoid valve and numeral 10 the electronic controller.

The electronic controller 10 is equipped with a microcomputer 11, input interfaces 12 to 15, an output interface 16 connected to the first speed change solenoid valve 5, an output interface 17 connected to the second speed change solenoid valve 6, and an output interface 18 connected to an engine control computer 20.

When the driver has selected the reverse range R, the reverse range detecting switch 3 is turned on. Also, the driver may select the winter mode by turning on the winter mode switch 4. When both the reverse range detecting switch 3 and the winter mode switch 4 are on, signals indicating the on state are read in and processed in the microcomputer 11, and output signals are transmitted to the engine control computer 20 via the output interface 18. Responsive to signals received from the microcomputer 11 ignition period delay angle signals are sent out from the engine control computer 20. The ignition period is delayed responsive to cylinder cut signals sent by the engine control computer 20 to a spark timing controller 22 via the driving circuit 21 to reduce the output torque of the engine.

Numeral 23 denotes a distributor for supplying the secondary high voltage for igniting the spark plugs 31 to 36.

The engine 30 would have 6 cylinders operated with the spark plugs 31 to 36. An alternative technique for cutting engine torque output, responsive to cylinder cut signals transmitted from the engine control use computer 20 to the driving circuit 25, is to cut the spark plugs 34 to 36, for example, out of the ignition circuit, leaving only the residual 3 spark plugs 31 to 33 in operation. This can be accomplished, for example, with the cutting out of injector pulses to the fuel injector as taught by Okino et al in U.S. Pat. No. 4,944,199, entitled "Control Apparatus for a Vehicle Engine Equipped with an Automatic Transmission", the teachings of which are incorporated herein by reference. When an injection pulse is skipped, as taught by Okino et al, the curve for the injector pulse becomes a straight line which requires that electrical current to the corresponding spark plug be cut off.

Therefore, since the driving power to the drive wheels is reduced when the output torque of the engine is reduced, wheel spinning can be prevented even at the time of start-up in reverse when the road surface is slippery.

The winter mode switch 4 is mounted in a location where manual switches have been conventionally mounted, for example, between the shift lever 31 at the side of the driver's seat and the brake lever 32. The winter mode switch 4 is a sway moving type switch and, by pushing the switch portion 4b represented as WINT SW, the operating mode can be set in the winter mode. To release winter mode, the switch portion 4a represented as OFF is pushed.

Detection of reverse range is effected by the reverse range detecting switch 3. For example, as shown in FIG. 1, when the operating rod 34 of the manual valve 33 of the automatic speed changer is moved to the reverse position R, the reverse range detecting switch 3 is switched on.

Figure 4:
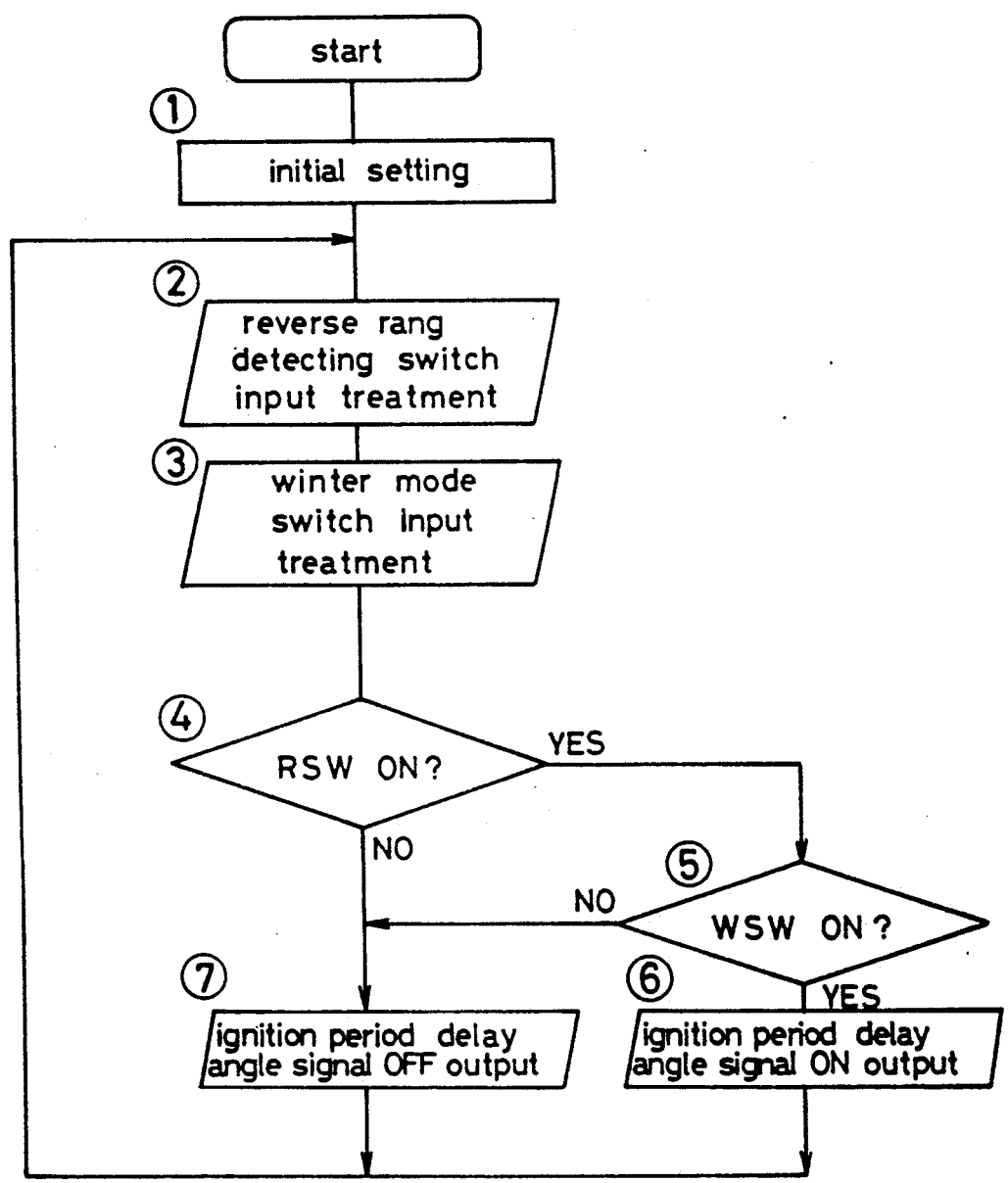
FIG. 4 is a block diagram illustrating control in accordance with one embodiment of the present invention.

FIG. 4 illustrates one embodiment of reverse state advancement control by an electronic control system in accordance with the present invention. The control steps in the embodiment of FIG. 4 are as follows:

At first, a control cycle is initiated in step 1.

Next, in step 2, the state of the reverse range detecting switch (RSW) is inputted.

Next, in step 3, the state of the winter mode switch (WSW) is inputted.

Next, in step 4, a determination is made as to whether the reverse range detecting switch (RSW) is on or not.

As a result, in the case when the reverse range detecting switch (RSW) is on, the control cycle proceeds to step 5 where a determination is made as to whether the winter mode switch (WSW) is on or not.

As a result, in the case when the winter mode switch (WSW) is on, in step 6, ignition period delay angle signals are transmitted to the engine control computer.

When the reverse range detecting switch (RSW) is not on, the control cycle skips steps 5 and 6 and the ignition period delay angle signals are not transmitted as in step 7.

FIG. 5 illustrates another embodiment of reverse start advancement time control by an electronic control system in accordance with the present invention.

In step 11, a control cycle is initiated.

Next, in step 12, input indicating the state of the reverse range detecting switch (RSW) is received.

Next, in step 13, input indicating the state of the winter mode switch (WSW) is received.

Next in step 14, judgement is made as to whether the reverse range detecting switch (RSW) is on, judgement is then made in step 15 as to whether the winter mode switch (WSW) is on, and cylinder cut signals are then transmitted to the engine control use computer in step 16.

In the case when the reverse range detecting switch (WSW) is not on, the cylinder cut signals are not transmitted as shown in step 17.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A vehicular electronic control system for controlling engine torque transmitted to the drive wheels for start-up in reverse on a slippery road surface, said system comprising:

a manual shift for selecting forward and reverse driving ranges;

an on-off manual winter mode selecting switch for enabling engine torque control when on a slippery road surface;

reverse detection means for detecting selection of reverse range; and engine torque control means for reducing torque transmitted to the drive wheels responsive to detected selection of reverse range only when said winter mode selecting switch is on.

2. A control system in accordance with claim 1 wherein said engine torque control means comprises:

a microprocessor for receiving on signals from said reverse detection means and from said winter mode selecting switch and for generating a first control signal responsive to said on signals;

an engine control computer for receiving said first control signal and for generating a second control signal for control of engine torque.

3. A control system in accordance with claim 2 additionally comprising:

a vehicle speed sensor for detecting vehicle speed and for generating a vehicle speed signal;

a throttle sensor for detecting the degree of throttle opening and generating a throttle signal; and wherein said vehicle speed signal and said throttle signal are received and utilized by said microprocessor in generation of said second control signals.

4. A control system in accordance with claim 1, wherein said engine torque control means comprises means for regulating timing to reduce engine torque.

5. A control system in accordance with claim 2 further comprising means for regulating timing to reduce engine torque, responsive to said second control signal.

6. A control system in accordance with claim 3 further comprising means for regulating timing to reduce engine torque, responsive to said second control signal.

7. A control system in accordance with claim 1, wherein said engine torque control means comprises means for cutting off ignition in one or more cylinders to thereby reduce engine torque.

8. A control system in accordance with claim 2 further comprising means, responsive to said second signal, for cutting off ignition in one or more cylinders to thereby reduce engine torque.

9. A control system in accordance with claim 3 further comprising means, responsive to said second signal, for cutting off ignition in one or more cylinders to thereby reduce engine torque.

10. A method of controlling vehicle engine torque to provide smooth start-up in reverse on a slippery road surface, said method comprising:

selecting a winter mode for vehicle operation by manual operation of a winter mode selection switch;

manually shifting into reverse; and reducing engine torque responsive to said selection of winter mode and said shifting into reverse.

11. The method of claim 10 further comprising:

sensing vehicle speed and throttle opening and wherein said reducing of engine torque is additionally responsive to the sensed vehicle speed and throttle opening.

12. The method of claim 10 wherein said reduction of engine torque is effected by retarding ignition timing.

13. The method of claim 11 wherein said reduction of engine torque is effected by retarding ignition timing.

14. The method of claim 10 wherein said reduction of engine torque is effected by cutting off ignition in one or more cylinders of the engine.

15. The method of claim 11 wherein said reduction of engine torque is effected by cutting off ignition in one or more cylinder of the engine.

* * * * *